United States Patent [19]

Clanin

[11] Patent Number: 5,000,009
[45] Date of Patent: Mar. 19, 1991

[54] METHOD FOR CONTROLLING AN ELECTRONIC EXPANSION VALVE IN REFRIGERATION SYSTEM

[75] Inventor: Thomas J. Clanin, Onalaska, Wis.

[73] Assignee: American Standard Inc., New York, N.Y.

[21] Appl. No.: 513,140

[22] Filed: Apr. 23, 1990

[51] Int. Cl.$^5$ ............................................. F25B 41/00
[52] U.S. Cl. ........................................ 62/115; 62/212; 62/225
[58] Field of Search ................... 62/210, 115, 212, 225

[56] References Cited

U.S. PATENT DOCUMENTS

| | | | |
|---|---|---|---|
| 4,790,145 | 12/1988 | Thompson et al. | 62/225 X |
| 4,807,445 | 2/1989 | Matsuoka et al. | 62/212 |
| 4,835,980 | 6/1989 | Oyanagi et al. | 62/212 |
| 4,934,155 | 6/1990 | Lowes | 62/225 X |

*Primary Examiner*—William E. Wayner
*Attorney, Agent, or Firm*—William J. Beres; William O'Driscoll; David L. Polsley

[57] ABSTRACT

In a refrigeration system including an incremental expansion valve and an electronic controller for controlling the operation of the expansion valve, a method of controlling the expansion valve in response to a sensed condition of the refrigerant in the system. According to the method, the valve controller alters the control gain rate to provide compensation in the valve flow rate for changing refrigerant conditions in the system due to the staging of multiple condenser fans and flooding of the evaporator.

11 Claims, 1 Drawing Sheet

METHOD FOR CONTROLLING AN ELECTRONIC EXPANSION VALVE IN REFRIGERATION SYSTEM

TECHNICAL FIELD

This invention pertains generally to methods of controlling refrigeration systems having an incremental electronic expansion valve and particularly to methods of controlling refrigeration systems with such valves where the method further includes compensation for the staged operation of multiple fans and for flooded evaporator conditions.

BACKGROUND ART

In typical refrigeration and air conditioning systems utilizing an expansion valve for control of refrigerant, the expansion valve has typically been a thermostatic type mechanical valve, directly responsive to a sensed refrigerant condition such as pressure or temperature at one point in the system. More recently, electronic expansion valves have been developed. While there are several types, the most common are the pulse type and the incremental or stepper motor driven sliding gate type. These valves are typically operated by an electronic controller. While in many cases the controller includes a microprocessor having an instruction set or program, the typical controller operates the valve in response to one or more signals from sensors measuring refrigerant conditions in the refrigeration system.

Many refrigeration systems are installed in temperate zone areas, where the condensers of the systems are exposed to widely varying ambient temperature and humidity conditions. It is also typical to include compressors having variable capacity in such systems. For this reason, many refrigerations systems with air cooled condensers contain one or more condenser fans to aid in the condensation of refrigerant in the condenser. In response to changes in either compressor capacity or in the ambient conditions, it is typical to stage the operation of these fans. This is accomplished by operating only that number of fans necessary to obtain optimum cooling of the condenser, starting additional fans or stopping the fans as necessary. The program executed by the microprocessor of the controller typically determines the duration of operation of the fans. However, when such fans are started or stopped, the condition of the refrigerant in the condenser changes as well. When a fan is started, the refrigerant condensing pressure is reduced and the actual valve flow rate is decreased, which can cause undesirably low pressure and temperature conditions in the evaporator. Conversely, when a fan is stopped, the refrigerant condensing pressure increases, which increases the actual valve flow rate and can flood the evaporator. Furthermore, the effect upon the refrigeration system of starting or stopping the condenser fans is more pronounced as the condenser ambient temperature decreases. As the system continues to operate, the refrigerant condition change manifests itself to the sensors of the system and the controller responds by altering the required flow rate through the expansion valve. The ability of the controller to sense the condition of the refrigerant system and respond appropriately to the changes in condition is crucial to the proper operation of the refrigeration system.

Similarly, refrigeration systems installed in temperate zone locations also experience low ambient temperature conditions, and can experience flooding of the evaporator, especially at compressor startup in the system. Evaporator flooding can also occur in refrigeration systems having water cooled condensers, such as water chillers, where the water temperature decreases relatively rapidly after system startup. As with condenser fan staging, the condition is typically manifested to the sensors of the system, with the controller responding by altering the flow rate through the valve. However, it is desirable to respond rapidly to evaporator flooding, as liquid refrigerant can be directed into the compressor in this condition and cause liquid slugging and possible damage to the compressor In both cases described above, action is often taken by the controller to correct the condition after the condition is observed. The preferable course would be to provide some flow rate adjustment in compensation for the expected refrigerant conditions which result from an alteration in system operating status. For example, it would be desirable to adjust the valve control parameters in the controller concurrently with the staging of the condenser fans. It would also be desirable to vary control parameters in response to certain conditions, such as by varying the response time of the controller when flooding of the evaporator is found in order to provide an increasingly rapid response as the flooding condition continues.

Therefore, it is an object of the invention to provide a method of controlling an incremental electronic expansion valve in a refrigeration system.

It is another object of the invention to provide a method of controlling an incremental electronic expansion valve in a refrigeration system as will compensate for expected refrigerant conditions which result from refrigerant system status alterations by adjusting the control parameters in the system controller.

It is a further object of the invention to provide a method of controlling an incremental electronic expansion valve in a refrigeration system as will respond rapidly to evaporator flooding.

It is yet another object of the invention to provide such a method as will be readily implemented in a refrigeration system.

These and other objects of the present invention will be apparent from the attached drawings and the description of the preferred embodiment that follows hereinbelow.

SUMMARY OF THE INVENTION

The subject invention comprises a method of controlling an incremental electronic expansion valve in a refrigeration system, the method including compensation for the staged operation of one or more condenser fans by adjustment of the valve control parameters at the time of the fan staging operation. The method also includes a variable rate response to sensed evaporator flooding occurring during system operation or at system startup.

BRIEF DESCRIPTION OF THE DRAWING

The drawing FIGURE depicts in schematic a refrigeration system embodying the subject invention.

DESCRIPTION OF THE PREFERRED EMBODIMENT

Figure 1:
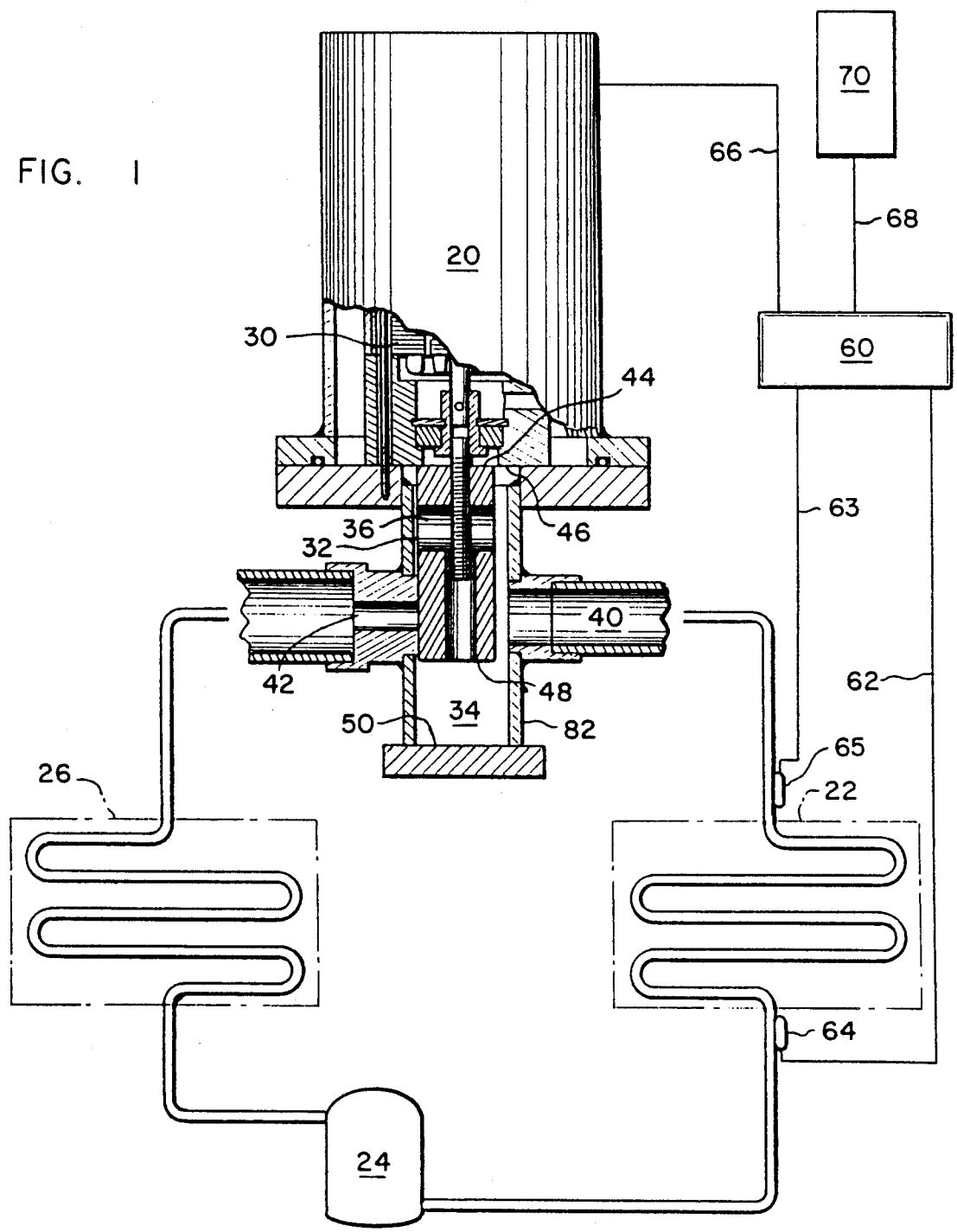

A refrigeration system embodying the subject invention is generally shown in the drawing FIGURE and referred to by the reference numeral 10. It will be appreciated by those skilled in the art that the refrigeration system 10 as suitably modified, is applicable to a wide variety of refrigeration and air conditioning applications.

The refrigeration system 10, as shown in schematic form in the drawing FIGURE, comprised of a variable flow rate expansion valve 20 for providing a controlled flow rate and expansion of the refrigerant, an evaporator 22 in flow connection with the valve 20 for gasifying the expanded refrigerant, a compressor 24 in flow connection with the evaporator 22 for receiving and compressing the gasified refrigerant, and a condenser 26 in flow connection with the compressor 24 for receiving and liquefying the refrigerant from the compressor 24. The valve 20 is also in flow connection with the condenser 26 for receiving and controllably expanding the liquefied refrigerant. It is, of course, readily apparent to those skilled in the art that the evaporator 22, the condenser 26 and the compressor 24 could be of any suitable type.

According to the preferred embodiment, the refrigeration system includes condenser fans 28 in flow connection with the condenser 26. The condenser fans 28 act as means for cooling the condenser 26, and may be staged, or independently selectively operated. While two condenser fans 28 are shown for convenience, it will be obvious to those skilled in the art that the refrigeration system may employ any number of condenser fans 28, including one, three or more.

The valve 20 preferably includes a three-phase stepper motor 30 which operates a metering piston 32 linearly within a metering chamber 34. The metering 32 piston includes a metering orifice 36 and reciprocates incrementally to permit a regulated flow or to prevent flow through the valve 20 by way of a valve inlet 40, the metering orifice 36 and a valve outlet 42. In the closed position, the valve outlet 42 is covered by the metering piston 32 so that flow is prevented through the valve 20. It is considered preferable to use the incremental valve 20 rather than a solenoid driven reciprocating pulse valve to minimize the fluid shock in the system due to the interrupted pulse flow of such a valve.

A controller 60 is connected by a first wiring harness 62 to a sensor 64. The sensor 64 is disposed at the evaporator 22 to determine either the outlet pressure or outlet temperature of the refrigerant from the evaporator 22. A second wiring harness 63 connects a second sensor 65 to the controller 60 for sensing the inlet pressure or inlet temperature of the refrigerant at the evaporator 22. Those skilled in the art will recognize that the pressure or temperature at the evaporator 22 outlet corresponds to the inlet pressure or temperature at the compressor 24, and that the pressure or temperature at the inlet of the evaporator 22 corresponds to the outlet pressure or temperature at the valve 20, so that various types and dispositions of the sensors 64 and 65 are available which will permit the controller 60 to obtain substantially the same information about the condition of the refrigeration system.

A third wiring harness 66 connects the controller 60 to the valve 20 to enable at least the transmission of control signals from the controller 60. Preferably, a fourth wiring harness 68 is provided to connect the controller 60 to an interface device 70 to enable an operator, service technician, or other user to interact with the controller 60 for purposes of setting operating parameters, for systems testing, or for other purposes.

It is believed that the general construction and operation of refrigeration systems are well known to those skilled in the art and need not be explained in detail herein, and therefore no in-depth discussion of the principals of refrigeration system operation need be undertaken herein. The described system is to be understood as exemplary rather than limiting.

The preferred embodiment of the control method of the subject invention is disclosed in Appendices A and B. Generally, Appendix A delineates in exemplary form the preferred embodiment of the control method of the subject invention, while Appendix B delineates the various parameters and variables of the control method according to Appendix A. Control of the valve 20 is based upon the determined super heat temperature S of the refrigerant. The super heat S is determined by sensing the temperature tc of the refrigerant as it enters the compressor and the temperature tv of the refrigerant as it leaves the expansion valve and determining the difference therebetween. For control purposes, an active setpoint Sa is provided in the controller 60. This active setpoint Sa is preferably 12° F. and is used by the controller 60 for reference purposes in controlling the operation of the valve 20 in the absence of a setpoint Su entered by a systems user. In the event that a user setpoint Su has been entered by a systems user, the active setpoint Sa is modified to eventually equal the user setpoint Su. This modification is limited by a predetermined slew rate limiting constant R in order to minimize disturbances to the refrigeration system due to large changes in operating parameters when in operation.

After determining the setpoint Sa to be used, the control error E may be determined. The control error E is the difference between the active setpoint Sa and the super heat temperature S. In order to minimize "hunting" of the refrigeration system 10, it is also desirable to provide a deadband function Edb which limits the operation of the valve when the control error E is within a predetermined range.

Flooding compensation is also provided by the control method by the determination of an evaporator flooding condition parameter Cf. The parameter Cf increases parabolically with time during the continuation of flooding conditions.

The valve 20 is operated a number of steps Ds in response to the control error E as limited by the deadband function Edb. The number of steps Ds is determined according to a function of an algorithm gain Kp, the deadband function Edb and the flooding condition parameter Cf. However, it is desireable to limit the number of steps Ds undesireably large fluctuations in the rate of flow through the valve 20. Therefore, a limitation Dlim is provided upon the number of steps which the valve 20 may be operated during a given iteration of the control method. The valve 20 is then operated open or closed in accordance with the number of steps Ds determined to be necessary to cause the super heat S to equal the setpoint Sa.

Turning now to Appendices A and B, the method of controlling the valve 20 is disclosed in more detail. The controller 60 senses the temperature Tv of the refrigerant leaving the expansion valve 20 and senses the temperature Tc of the refrigerant entering the compressor 24. The system super heat temperature S is determined by subtracting the temperature Tv from the temperature Tc. In order to prevent improper operation of the refrigeration system 10 during startup with a flooded evaporator, the super heat is limited by a constant Smin, which is preferably a small negative number. In the event that the super heat S is below Smin, the super heat S is set to equal the value of Smin. At startup, the active setpoint Sa initialized to a predetermined value. Preferably, this value is on the order of 12° F. In the event that the controller 60 is in its second or subsequent iteration and a user setpoint value Su has been entered, the value of the active setpoint Sa is that value determined in the previous iteration of the control method.

In the event that a user setpoint has been entered, the active setpoint is modified by comparison therewith. If the active setpoint Sa is greater than or equal to the user setpoint Su plus a predetermined constant R, the active setpoint Sa is decreased by the value of the constant R. Likewise, if the active setpoint is less than or equal to the user setpoint less the value of the constant R, the active setpoint is increased by the value of the constant R. Preferably, the value of the slue rate limiting constant R is on the order of 0.0625.

The control error E and the deadband error Edb can then be determined. The control error E is determined simply by subtracting the actual super heat S from the current active setpoint Sa. The controller 60 then compares the control error E with a deadband constant D. In the preferred embodiment, D equals 0.1. If the control error E is greater than the deadband constant D, the deadband compensated control error Edb is determined by reducing the control error E by the value of the constant D. In the event that the control error E is less than the deadband constant D, the value of the constant D is added to the control error E to determine the compensated control error Edb.

The flooding condition parameter Cf is determined by comparison of the actual super heat S to acceptable minimum and maximum conditions Fmin and Fmax. In the preferred embodiments, for example, Fmin equals 1 and Fmax equals 4. In order to accomplish the desired parabolic increase of the flooding condition parameter Cf, a count parameter flood count is used. Where the super heat S is less than the acceptable minimum Fmin, the flood count is increased by 1, while if the super heat exceeds the maximum acceptable flood condition Fmax, the flood count is set to 0. However, where the super heat S is greater than or equal to the minimum condition Fmin but less than or equal to the maximum flood condition Fmax minus 1, the flood count continues unchanged from the last iteration of the control method. Where the super heat S is greater than the maximum flood condition Fmax minus 1 or less than or equal to the maximum flood condition Fmax, the flood count value is decreased by 1. The parameter Cf is determined by multiplying the value of flood count times a constant C1 and adding the result to a second constant C2. An exemplary suitable value of the first constant C1 is preferably on the order of 0.085, while an exemplary suitable value of the second constant C2 is on the order of 0.5. The constants C1 and C2 may be varied to provide variations in the rate of response of the parameter Cf. In order to minimize disturbances in the refrigeration system 10 due to unduly large changes in the rate of flow through the valve 20 the flooding condition parameter Cf is limited by the minimum Cfmin, preferably having a value of 1, and the maximum Cfmax, preferably having a value of 3.

The rate of response of the control method is determined by the algorithm gain Kp. During the first iteration of the control method by the controller 60, the algorithm gain Kp is set at a first value Kp1. The number N of condenser fans operating is also determined. During subsequent iterations of the control method, the controller 60 determines whether the current number N of condenser fans operating is identical with that of the previous number of condenser fans operating, and if so, Kp continues at the value Kp1. In the event that the number of condenser fans operating is not the same, the value of Kp is changed to a second value Kp2 and a timing function Nt1 is initiated. The controller 60 continues utilization of the value Kp2 until the expiration of the timing function Nt1, whereupon a timing function Nt2 is initiated. During the timing function Nt2 the algorithm gain Kp is reduced from the algorithm gain Kp of the previous iteration by a constant Cn which limits the rate of return of Kp2 to Kp1.

The controller then determines the number of steps Ds necessary to operate the valve 20. This determination is accomplished by the calculation of a polynomial function. The first term of the function is arrived at by subtracting the value of the deadband error Edb from the previous iteration, if any, from the deadband control error of the current iteration and multiplying the result times the algorithm gain Kp. The second term of the function is arrived at by multiplying the algorithm gain times the flooding condition parameter Cf times the parameter T times the deadband control error Edb and dividing the result by the parameter Ti. The third term of the function is the residue or fractional component of any steps from the previous iteration of the control method, if any. The number of steps Ds is the integer component of the calculated result Ds, with the residue being any remaining fractional component of Ds. A limit Dlim is provided to limit the number of steps which the valve is operated. In the preferred embodiment, the value of Dlim is 49 steps. If the number of steps Ds is greater than Dlim, the maximum number of steps which the valve may be operated is 49 steps closed, and if the value Ds is less than negative Dlim, the maximum number of steps which the valve 20 may be driven open is 49 steps. Finally, when the value of the number of steps Ds is greater than 0, the valve 20 is driven closed, while if the value of Ds is less than 0, the valve 20 is driven open. The control method is then iterated or repeated at an interval Ci, preferably of 2 seconds, until the compressor is turned off by the controller 60.

In operation, the controller 60 drives the valve 20 open a predetetmined number of steps and activates the compressor 24 of the refrigeration system 10. Upon activating the refrigeration system 10, the controller 60 senses the temperature Tv of the refrigerant leaving the expansion valve and the temperature Tc of the refrigerant entering the compressor 24 and determines the super heat S. The controller 60 then provides the active setpoint Sa and determines whether a user setpoint Su has been entered through the interface 70. In response to any entry of a user setpoint Su, the active setpoint Sa is modified to the user setpoint Su by the application of a slew rate limiting constant R. In each subsequent iteration of the control method, the active setpoint Sa then approaches and equals the user setpoint Su. The control error E, being the difference of the active setpoint, which is the desired super heat temperature, and the actual sensed super heat S, is determined. The resulting control error E is compared to the deadband function Edb to prevent unnecessary operation of the valve 20.

The flooding condition parameters Cf is determined by comparing the actual super heat S to a minimum acceptable flooding condition parameters Fmin and a maximum acceptable flooding parameter Fmax. The algorithm gain Kp is set to the first value, in accordance with the number of condenser fans operating. In the event that the number of condenser fans operating is changed, the algorithm gained Kp is increased from the first value Kp1 to a second value Kp2 for a first predetermined time interval Nt1, and upon the expiration of Nt1, the value of Kp is reduced from Kp2 to Kp1 during each iteration of the valve by a constant Cn which minimizes disturbance of the rate of flow in the refrigeration system 10.

The number of steps Ds is then determined by the polynomial equation in which the first term involves determining the difference between the current deadband function Edb and the previous deadband function Edb, if any, and multiplying the result by the algorithm gain Kp. The second term is determined by dividing the deadband function Edb by a deadband time interval Ti and multiplying the result by the algorithm gain Kp, the flooding condition parameter Cf, and the time parameter T. In the event that there is a residual or fractional portion of a step remaining from a previous iteration of the control method, this residual is also added to the first and second terms to determine the number of steps Ds to operate the valve. The number of steps Ds is limited by a predetermined limit Dlim. The valve is then operated closed in the event that the number of steps is a positive number or greater than 0, and is driven open in the event that the value of Ds is a negative number.

The deadband function Edb used in the control method is retained for use as the previous deadband function Edb. The controller 60 repeats the control method at a control time interval Ci of preferably 2 seconds so long as the compressor 24 is operable.

It will be apparent to those skilled in the art that the control method according to the subject invention controls the valve 20 in such a way as to enhance recovery from disturbances in the refrigeration system 10 resulting from large rates of change of flow through the valve 20. The control method further provides such control while adapting the control response to changes in the number of condenser fans operating and to flooding conditions of the evaporator. Since these events themselves normally result in large changes in the rate of flow in the refrigerant system, it will be apparent that the control method operates to provide a refrigeration system 10 wherein the changes of the refrigerant superheat within the refrigeration system have been minimized so as to provide rapid recovery of the refrigeration system and to minimize hunting of the valve for the proper rate of flow through the system. By providing compensatory control response of the valve 20 to changes as they are made by the controller 60, rather than merely reacting to the effects of changes having already occurred in the refrigeration system 10, it will be apparent that the control method will inprove system performance, reduce the maintenance requirements and increase the life of the refrigeration system 10. Those skilled in the art will recognize that the control method according to the subject invention provides a substantial improvement in the art of the control of refrigeration systems.

Modification to the preferred embodiment of the subject inventions will be apparent to those skilled in the art within the scope of the claims that follow hereinbelow.

APPENDIX A

Compressor ON
sense Tv
Sense Tc
calculate $S = Tc - Tv$
$S < Smin$, set $S = Smin$
initialize Sa = predetermined value
Su entered?
   Yes
   if $Sa > = Su + R$, set $Sa = Sa - R$
   if $Sa < = Su - R$, set $Sa = Sa + R$
$E = Sa - S$
determine deadband error
   if $E > D$, set $Edb = E - D$
   if $E < D$, set $Edb = E + D$
determine flooding condition parameter Cf
   if $S < Fmin$, set floodcount = floodcount + 1
   if $S > Fmax$, set floodcount = 0
   if $Fmin < = S < = Fmax - 0.5$, floodcount unchanged
   if $Fmax - 0.5 < S < = Fmax$, set floodcount = floodcount − 1
   $Cf = C1 *$ floodcount $+ C2$
   if $Cf < Cfmin$, set $Cf = Cfmin$
   if $Cf > Cfmax$, set $Cf = Cfmax$
determine Kp
   if $N = Nprev$, set $Kp = Kp1$
   if $N \neq Nprev$ and (>5 minutes after startup OR no fans at startup), set $Kp = Kp2$ and initiate Nt1
   continue $Kp = Kp2$ until expiration of Nt1,
   initiate Nt2 upon expiration of Nt1, set
   $Kp = Kp(prev) - Cn$ until
   $Kp = Kp1$
determine Ds
   $Kp (Edb - Edb(prev))$
   $+ Kp * Cf * T * Edb/Ti$
   $+$ Residue
   if $Ds > Dlim$, set $Ds = Dlim$
   if $Ds < -Dlim$, set $Ds = -Dlim$
   if $Ds > 0$, drive valve 20 closed Ds steps
   if $Ds < 0$, drive valve 20 open Ds steps
repeat at interval Ci until compressor OFF

APPENDIX B

Tv = temp leaving valve
Tc = temp entering compressor
S = system super heat
Smin = minimum (negative) value of super heat
Sa = system setpoint
Su = user entered setpoint
R = slew rate limiting constant
E = control error
Edb = deadband compensated control error
D = deadband constant
Fmin,Fmax = limits of super heat for controlling flooding condition response
C1,C2 = constants to control rate of response to flooding condition
N = number of condenser fans operating
Npre = number of fans previously operating
Nt1,Nt2 = predetermined fan staging response time intervals
Cn = constant for limiting rate of return Kp2 to Kp1
Ds = number of valve steps
Dlim = maximum number of valve steps
Ci = control interval

What is claimed is:

1. A method of controlling an incremental electronic expansion valve in a refrigeration system including a controller for operating the expansion valve, a condenser including a number of selectively operable condenser fans, a compressor and an evaporator in closed loop connection with the expansion valve, said method comprised of:

determining a superheat temperature S of refrigerant;
providing an active setpoint Sa at compressor startup;
determining a user setpoint Su;
modifying said active setpoint Sa to equal said user setpoint Su, said modification being slew rate limited;
determining the control error E as the difference between the active setpoint Sa and the superheat temperature S;
providing a deadband function Edb of the control error E for limiting the operation of the valve when the control error E is within a predetermined range;
determining a first value of an evaporator flooding condition parameter Cf;
determining a number of steps Ds to operate said valve, where said number of steps Ds is determined according to a function of an algorithm gain Kp and said deadband function Edb and of said algorithm gain Kp and said flooding condition Cf;
limiting said steps Ds to a predetermined limit where the number of steps Ds exceeds said predetermined limit; and
operating said valve the number of steps Ds.

2. The method of controlling an incremental electronic expansion valve in a refrigeration system as set forth in claim 1 wherein the method includes the further step of increasing said algorithm gain Kp from a first valve to a second value for a first predetermined time interval when the number of condenser fans operating is changed.

3. The method of controlling an incremental electronic expansion valve in a refrigeration system as set forth in claim 2 wherein the method includes the further step of reducing said algorithm gain Kp from said second value to said first value for a second predetermined time interval upon the expiration of said predetermined time interval.

4. The method of controlling an incremental electronic expansion valve in a refrigeration system according to claim 3 wherein said method includes the further step of increasing the algorithm gain Kp from said first value to a third value when the superheat temperature S exceeds a predetermined limit.

5. The method of controlling an incremental electronic expansion valve in a refrigeration system according to claim 4 wherein said method includes the further step of increasing parabolically the value of the flooding condition parameter Cf from said first value when the evaporator is flooded.

6. The method of controlling an incremental electronic expansion valve in a refrigeration system according to claim 5 wherein the second value of said algorithm gain Kp is reduced linearly to said first value.

7. The method of controlling an incremental electronic expansion valve in a refrigeration system according to claim 6 wherein the value of the flooding condition parameter Cf is increased parabolically from said first value when the evaporator is flooded.

8. The method of controlling an incremental electronic expansion valve in a refrigeration system according to claim 7 wherein said method includes the further steps of:

sensing temperature Tv of refrigerant leaving the expansion valve;
sensing a temperature Tc of refrigerant entering the compressor; and
determining said superheat temperature S of refrigerant as the difference between the temperature Tc of refrigerant entering the compressor and the temperature Tv of refrigerant leaving the expansion valve.

9. A method of controlling an incremental electronic expansion valve in a refrigeration system including a controller for operating the expansion valve, a condenser including a number of selectively operable condenser fans, a compressor and an evaporator in closed loop connection with the expansion valve, said method comprised of:

determining a superheat temperature S of refrigerant at the evaporator;
providing an active setpoint Sa at compressor startup;
determining whether a user setpoint Su has been entered in said controller;
modifying said active setpoint Sa to said user setpoint Su;
determining the control error E as the difference between the active setpoint Sa and the superheat temperature S;
providing a deadband function Edb of the control error E for limiting the operation of the valve when the control error E is within a predetermined range;
determining an evaporator flooding condition parameter Cf;
providing an algorithm gain Kp having a first value;
increasing said algorithm gain Kp from the first valve Kp1 to a second value Kp2 for a first predetermined time interval when the number of condenser fans operating is changed;
increasing said algorithm gain Kp from said first value to a third value as a function of the superheat temperature S when the superheat temperature S exceeds a predetermined limit;
determining a number of steps Ds to operate said valve, where said number of steps Ds is determined by:
obtaining a first term by
determining the difference between said deadband function Edb and a previous deadband function Edb;
multiplying said difference by the algorithm gain Kp; and adding said first term to a second term determined by
dividing said deadband function Edb by a deadband time interval Ti;
multiplying the result thereof by the algorithm gain Kp, the flooding condition parameter Cf, and a time parameter T;
limiting said steps Ds to a predetermined limit where the number of steps Ds exceeds said predetermined limit;
operating said valve the number of steps Ds;
setting the previous deadband function Edb equal to the deadband function Edb; and
repeating the foregoing steps at the expiration of a control time interval Ci.

10. The method of controlling an incremental electronic expansion valve in a refrigeration system as set forth in claim 9 wherein the method includes the further step of reducing linearly said algorithm gain Kp from said second value to said first value for a second predetermined time interval upon the expiration of said predetermined time interval.

11. The method of controlling an incremental electronic expansion valve in a refrigeration system as set forth in claim 10 wherein the method includes the further step of slew rate limiting the modification of said active setpoint Sa to said user setpoint Su.

* * * * *